(12) United States Patent
Bagepalli et al.

(10) Patent No.: US 8,308,437 B2
(45) Date of Patent: Nov. 13, 2012

(54) WIND TURBINE WITH AUXILIARY FINS

(75) Inventors: Bharat Bagepalli, Niskayuna, NY (US);
Aniruddha D. Gadre, Rexford, NY (US); Nitin Narayan Bhate, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/094,237

(22) Filed: Apr. 26, 2011

(65) Prior Publication Data
US 2012/0051916 A1 Mar. 1, 2012

(51) Int. Cl.
*B64C 11/14* (2006.01)

(52) U.S. Cl. .................. 416/203; 416/245 R

(58) Field of Classification Search .......... 415/4.3, 415/4.5, 1; 416/234, 239, 245 R, 203
See application file for complete search history.

(56) References Cited

U.S. PATENT DOCUMENTS

| | | | |
|---|---|---|---|
| 7,074,011 B1 * | 7/2006 | Wobben | 416/126 |
| 7,513,746 B2 * | 4/2009 | McCabe | 416/197 R |
| 7,726,935 B2 * | 6/2010 | Johnson | 415/4.3 |
| 2007/0297909 A1 * | 12/2007 | Wobben | 416/223 R |
| 2009/0148291 A1 * | 6/2009 | Gerber et al. | 416/147 |
| 2009/0191064 A1 | 7/2009 | Herr et al. | |
| 2010/0135811 A1 * | 6/2010 | Kirtley et al. | 416/219 R |
| 2012/0107117 A1 * | 5/2012 | Godsk | 416/1 |

FOREIGN PATENT DOCUMENTS

WO  WO 2007057021 A1 * 5/2007

* cited by examiner

*Primary Examiner* — Christopher Verdier
*Assistant Examiner* — Andrew C Knopp
(74) *Attorney, Agent, or Firm* — Dority & Manning, P.A.

(57) ABSTRACT

A wind turbine includes a nacelle mounted atop a tower. Power generating components are housed within the nacelle. A rotor hub is rotationally coupled to the power generating components. A plurality of blades are fixed to the rotor hub. The blades include a root section extending radially outward from the rotor hub and an aerodynamic section extending radially outward from the root section, wherein lift is generated by the blades primarily along the aerodynamic section. Aerodynamic fins extend radially outward from the rotor hub alongside the root sections of the blades and have an aerodynamic shape so as to capture wind and impart rotational torque to the hub from a central impinging wind zone that is coaxial to the rotor hub and the blade root sections.

8 Claims, 4 Drawing Sheets

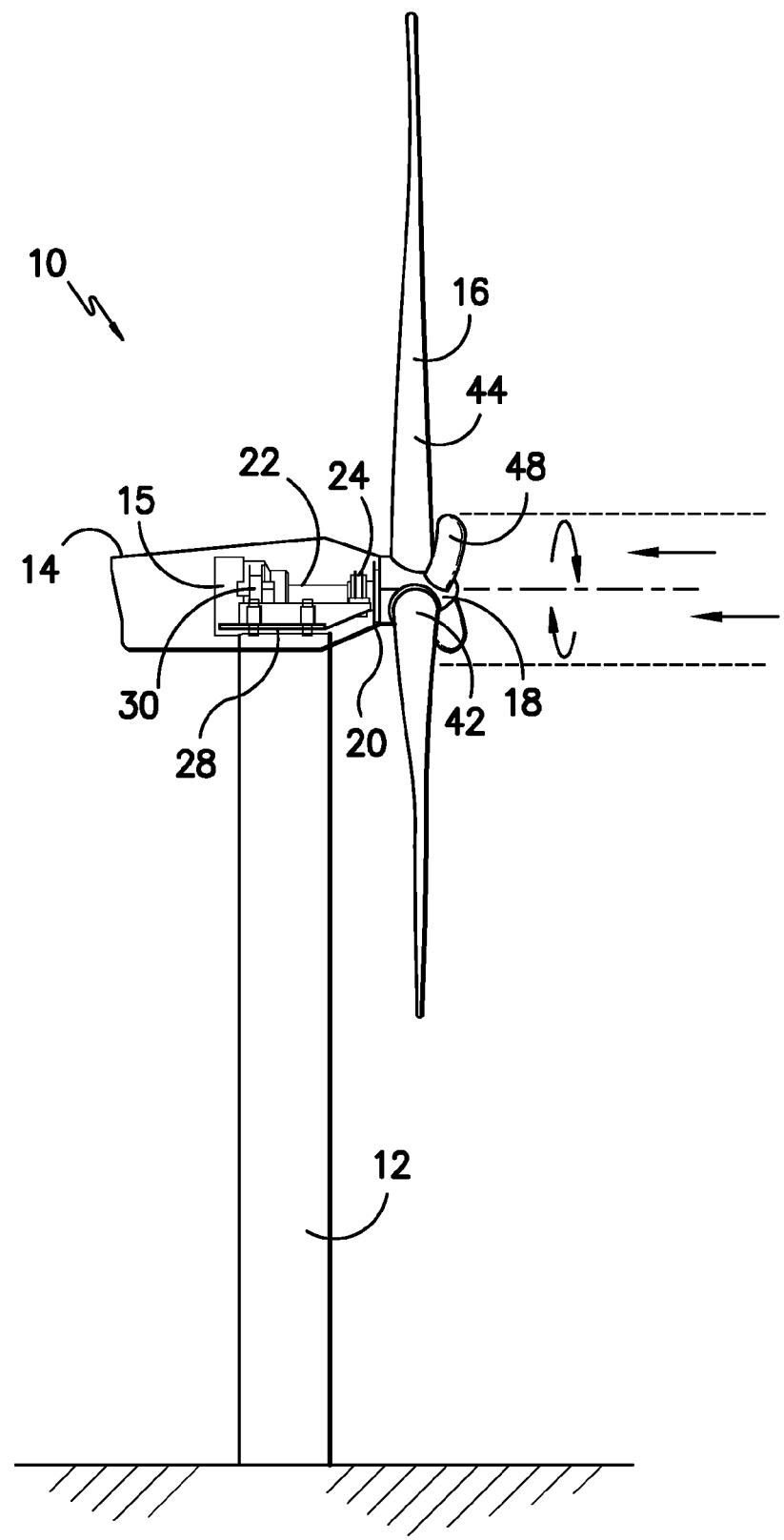
FIG. -1-

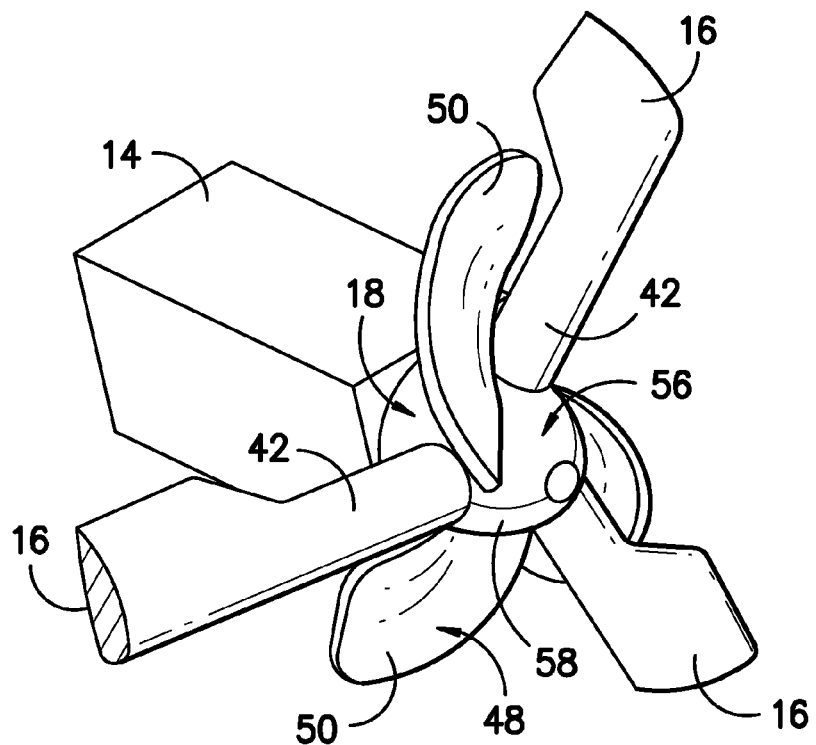
FIG. -2-
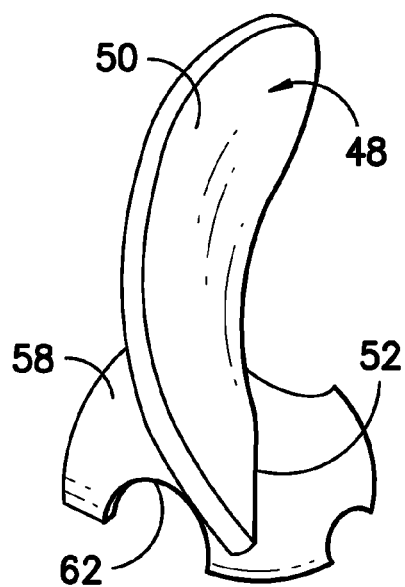
FIG. -3-

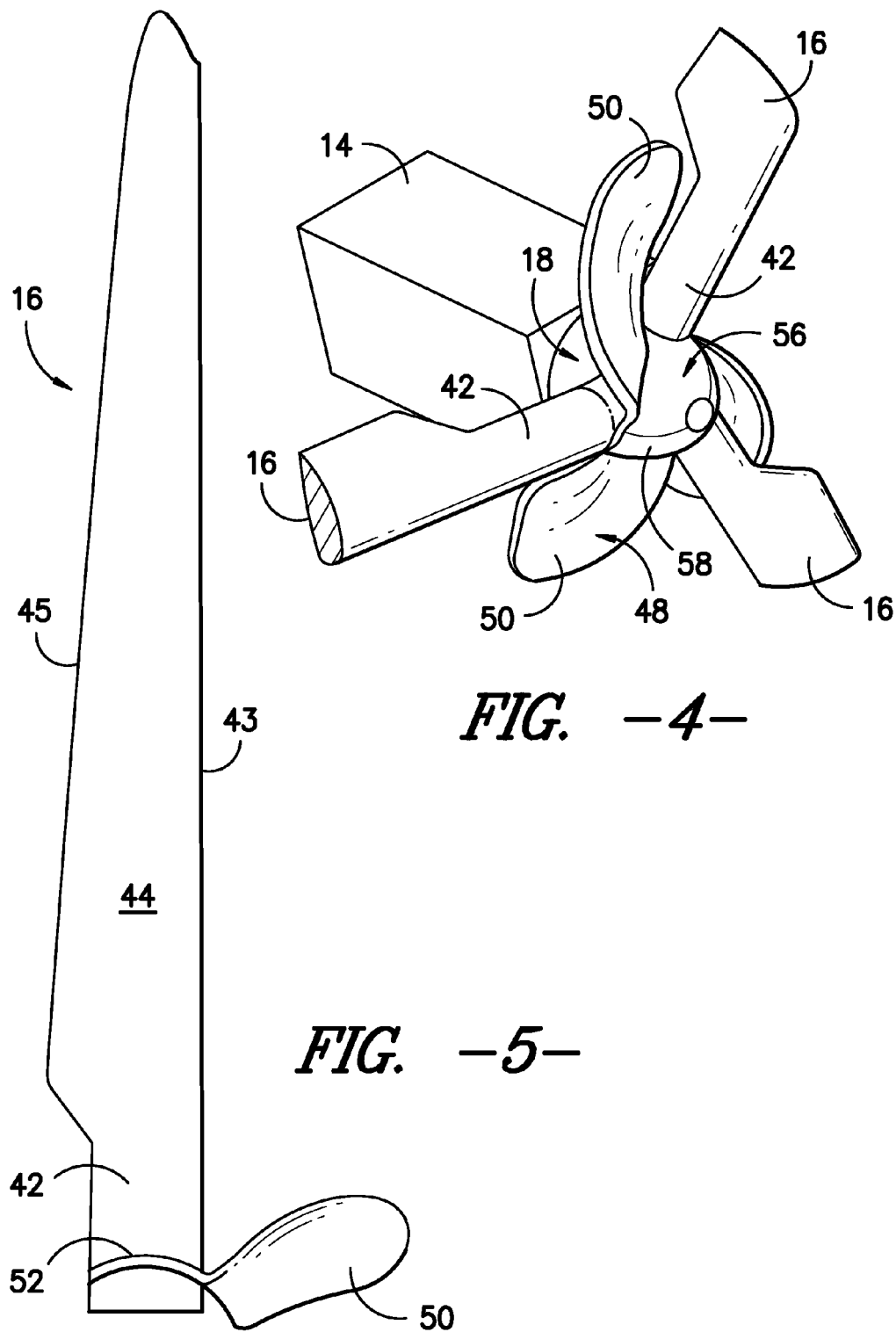

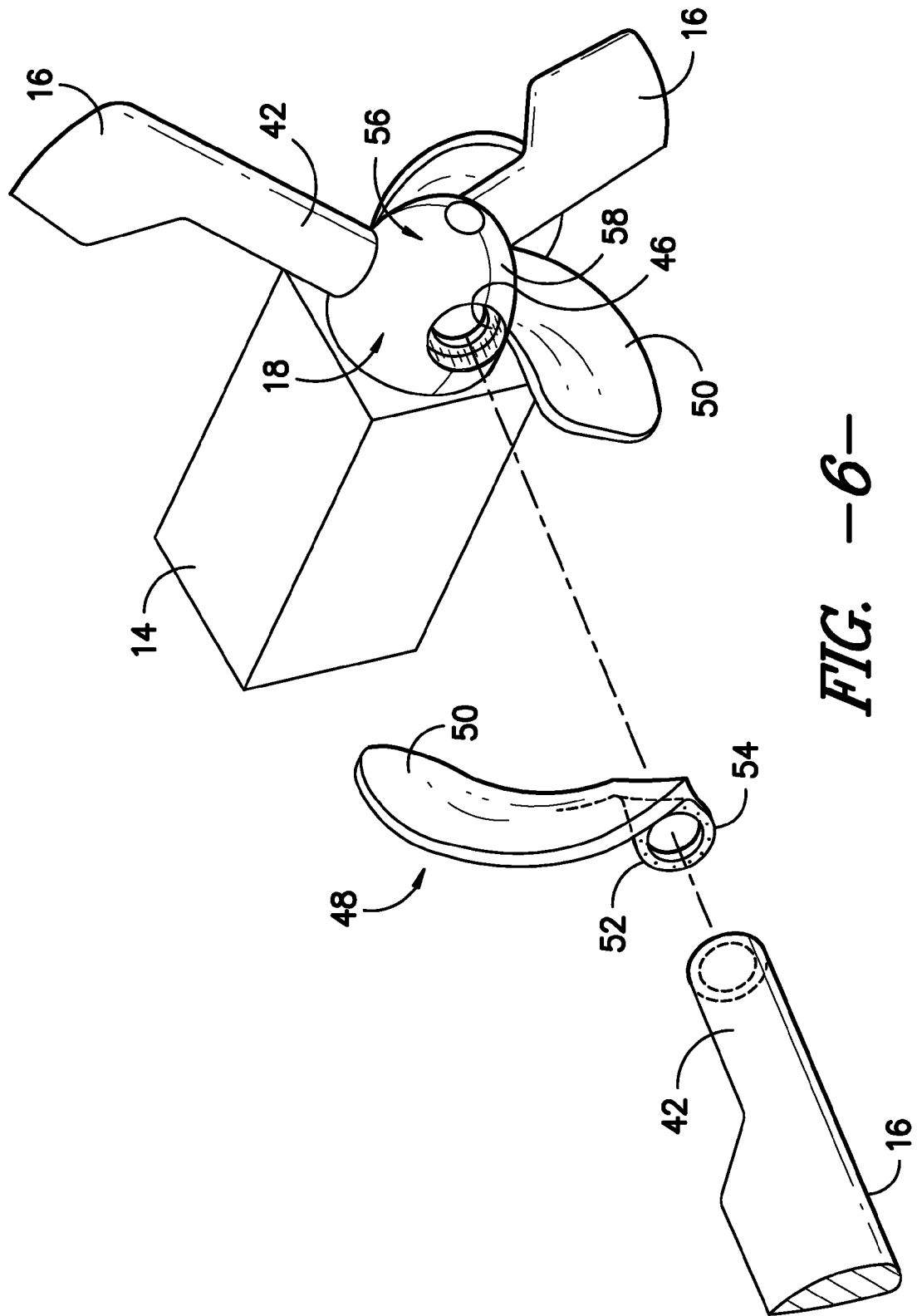
FIG. -6-

WIND TURBINE WITH AUXILIARY FINS

FIELD OF THE INVENTION

The present invention relates generally to wind turbines, and more particularly to a blade configuration for wind turbines.

BACKGROUND OF THE INVENTION

Turbine blades are the primary elements of wind turbines for converting wind energy into electrical energy. The blades have a cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Modern wind turbines can be quite large, with many designs having a rotor hub height exceeding 100 meters, and rotor diameters in excess of 80 meters. The blades have a root section mounted to rotor hub, with the aerodynamic shape of the blades defined radially outboard of the root section. This configuration results in a central "dead" wind zone that is coaxial to the rotor hub wherein virtually no energy is extracted from the wind by the blades. This dead zone can have up to, for example, a 5 meter radius.

Wind power is considered one of the cleanest, most environmentally friendly energy sources presently available, and wind turbines have gained increased attention and importance in this regard. However, the cost/benefit economics of wind energy is a constant consideration. The cost of producing the energy cannot outweigh the benefits. In this regard, the industry would benefit from improvements or advancements in wind turbine design and operation that would utilize the energy from the central dead wind zone to increase the output of the wind turbine.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine is provided with a tower, and a nacelle mounted atop the tower. Power generating components are housed within the nacelle, and a rotor hub is rotationally coupled to the power generating components, for example via a shaft. A plurality of blades are fixed to the rotor hub, with the blades having a root section extending radially outward from the rotor hub and an aerodynamic section extending radially outward from the root section, wherein lift is generated by the blades primarily along the aerodynamic section. Aerodynamic fins extend radially outward from the rotor hub alongside of the root sections of the blades. For example, the fins may extend radially between the root sections of the blades or may be aligned with the blades. The fins have an aerodynamic shape so as to capture wind and impart rotational torque to the hub from a central impinging wind zone that is coaxial to the rotor hub and generally coincident with the blade root sections.

The fins may have various aerodynamic shapes. For example, the fins may have an airfoil shape similar to the turbine blades. In another embodiment, the fins may have a flat, broad, pinwheel shape. The fins may extend radially to any position, including up to the aerodynamic sections of the blades.

The fins may be variously configured relative to the rotor hub. For example, the rotor hub may include a base and a nose cone mounted over the base, with the blades mounted to the base. In one embodiment, the fins are mounted to the nose cone, which may have individual segments with a respective fin mounted to each segment. In another embodiment, the fins may be mounted to the base and extend through the nose cone. In still a further embodiment, the fins may be mounted to the root section of a respective blade generally adjacent to the base.

The present invention also encompasses various method embodiments for improving the efficiency of any manner of erected wind turbine by attaching aerodynamic fins in a fixed relationship relative to the rotor hub. The fins extend radially outward from the rotor hub alongside of the root sections of the blades. The fins having an aerodynamic shape so as to capture energy from the wind "dead zone" and impart rotational torque to the rotor hub.

The methods may be performed as a retrofit procedure to existing wind turbines at a wind turbine site.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine in accordance with aspects of the invention;

FIG. 2 is a perspective view of a rotor hub with an auxiliary fin configuration in accordance with one embodiment;

FIG. 3 is a perspective view of a section of a rotor hub nose cone with an fin configured thereon;

FIG. 4 is a perspective view of a rotor hub with a different embodiment of an auxiliary fin configuration;

FIG. 5 is a perspective view of a wind turbine blade with an auxiliary fin configured at the root section thereof; and, FIG. 6 is a perspective component view of still another embodiment of an auxiliary fin configuration on a rotor hub.

DETAILED DESCRIPTION OF THE INVENTION

Reference now will be made in detail to embodiments of the invention, one or more examples of which are illustrated in the drawings. Each example is provided by way of explanation of the invention, and not as a limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

FIG. 1 illustrates a wind turbine 10 having various conventional components, including a tower 12 with a nacelle 14 mounted thereon. A plurality of turbine blades 16 are mounted to a rotor hub 18, which is in turn rotationally coupled to power generating components within the nacelle 14. For example, the rotor hub 18 may be connected to a main flange 20 that turns a main rotor shaft 22. The main rotor shaft 22 is coupled to a gearbox 30 via a shrink coupling. The gearbox 30 is connected to a generator 15 via a high speed shaft (not shown). The blades 16 convert motive force of wind into rotational mechanical energy via the shaft 22 and gearbox 30 to generate electricity with the generator 15.

Referring against to FIG. 1, the wind turbine blades 16 include a root portion 42 that extends radially outward from the rotor hub 18. The root portion 42 merges into an aerodynamic section 44 of the blade defined by a leading edge 43 and trailing edge 45 (FIG. 5). The aerodynamic section 44 is the portion of the blade designed to generate lift from an incident wind stream, as is well known in the art. The root portion 42 of the blades is typically a generally cylindrical portion that generates essentially no lift from the incident wind stream 40 within the radial area of the root portions 42, this area 40 depicted in FIG. 1 is often referred to as a "dead zone" in that the conventional blade configuration is incapable of generating lift from the wind in this zone.

Still referring to FIG. 1, a wind turbine 10 in accordance with aspects of the present invention includes a plurality of auxiliary aerodynamic fins 48 configured with the rotor hub 18. These fins 48 extend radially outward from the hub 18 alongside of the root portions 42 of the blades. For example, the fins 48 may be interspaced between the blades 16, as depicted in FIGS. 2 and 6. In alternate embodiments, the fins 48 may be aligned on the hub 18 with the blades 16, for example in front of the blades 16 towards the front end of the hub 18. The blades may extend partially into the space between the blade root sections 42 or, if mounted in front of the blades, completely across the space between the blade root sections 42. The fins 48 extend radially between the root sections 42 of the blades and have an aerodynamic shape so as to capture the wind in the dead zone 40 and impart rotational torque to the hub 18 from the wind zone 40 that is coaxial with the rotor hub and the blade root sections 42.

Referring to the figures in general, the auxiliary fins 48 may have any aerodynamic shape that is designed to efficiently convert the energy of the wind within the zone 40 to rotational torque. In the embodiment illustrated in the figures, the fins 48 have a relatively flat and broad blade segment 50 that extends from a base 52. These flat, broad blade segments 50 resemble, for example, a pinwheel-type of blade. In other embodiments, the blade segment 50 may be configured as an aerodynamic foil, similar to the foil shape of the main blades 16. It should be appreciated that the aerodynamic shape and configuration of the fins 48 may vary widely within the scope and spirit of the invention, and that the invention is not limited to any particular type or design of the fins 48.

The auxiliary fins 48 may extend from the hub 18 to any radial distance. In the illustrated embodiment, the fins 48 extend radially generally to the aerodynamic section 44 of the blades. It may be preferred that the fins 48 do not extend radially into the aerodynamic section 44 of the blades so as not to detract from the aerodynamic performance of the blades 16.

The auxiliary fins 48 may be configured with the rotor hub 18 in various ways. For example, in the embodiment depicted in FIGS. 2 and 3, the wind turbine blades 16 are attached to a base component of the rotor hub 18 (not visible in FIG. 2) and extend through a nose cone 56 that surrounds the base, as it is well known in the art. The nose cone 56 may be configured by a plurality of nose cone segments 58 that separately attach to the underlying base and include recesses 62 that fit around the root portion 42 of the respective blades 16. In the embodiment depicted in FIGS. 2 and 3, the auxiliary fins 48 are configured directly on the nose cone segments 58 and have a base 52 that is rigidly mounted on the respective segments 58. Thus, in this embodiment, the rotational torque of the auxiliary fins 48 is imparted through the nose cone segments 58 to the underlying base.

In an alternative embodiment depicted in FIGS. 4 and 5, the auxiliary fins 48 include a base segment 52 that extends directly from root portion 42 of the blades 16. The auxiliary fins 48 may be separately manufactured and rigidly affixed to the root portions 42 prior to installing the blades to the rotor hub 18 at the wind turbine site. Thus, in this embodiment, the rotational torque from the auxiliary fins 48 is imparted to the rotor hub 18 directly through the wind turbine blades 16.

In still a further embodiment depicted in FIG. 6, the auxiliary fins 48 include a flange member 54 at the base end 52. This flange 54 is configured to attach to the base component 46 of the hub 18 in-line with the root portion 42 of the blade 16. In other words, the flange 54 is bolted to the base 46 between the blade root portion 42 and the base. An opening 64 is defined in the respective nose cone segments 58 through which the blade segment portion 50 of the fins 48 extend in the assembled state of the components.

As discussed above, the present invention also includes various method embodiments for improving the efficiency of an existing wind turbine by attaching aerodynamic fins 48 in a fixed relationship relative to the rotor hub 18, as discussed above. The method may be performed as a retrofit procedure to existing wind turbines 10 at an existing wind turbine site.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine, comprising:
a tower;
a nacelle mounted atop said tower;
power generating components housed within said nacelle;
a rotor hub rotationally coupled to said power generating components;
a plurality of blades fixed to said rotor hub, said blades comprising a root section extending radially outward from said rotor hub, and an aerodynamic section extending radially outward from said root section, wherein lift is generated primarily by said blades along said aerodynamic section;
aerodynamic fins extending radially outward from said rotor hub, said fins disposed relative to said root sections of said blades and having an aerodynamic shape so as to capture wind and impart rotational torque to said hub from a central impinging wind zone coaxial to said rotor hub and said blade root sections;
wherein said rotor hub comprises a base and a nose cone mounted over said base, said blades mounted to said base and said fins mounted to said nose cone; and
wherein said nose cone comprises multiple segments mounted to said base, wherein each said segment has a respective said fin mounted thereto.

2. The wind turbine as in claim 1, wherein said fins extend radially up to said aerodynamic section of said blades.

3. The wind turbine as in claim 1, wherein said fins have a flat, pinwheel blade configuration.

4. The wind turbine as in claim 1, wherein said fins are interspersed around said rotor hub between said blade root sections such that said aerodynamic shape of said fins are radially offset from and non-aligned with said aerodynamic sections of said blades in all positions of said blades relative to said rotor hub.

5. The wind turbine as in claim 1, wherein said fins are aligned on said rotor hub in front of said blades.

6. The wind turbine as in claim 5, wherein said fins extend at least partially into the space between said root sections of adjacent said blades.

7. A method for improving the efficiency of a wind turbine, wherein the wind turbine includes:
- a tower;
- a nacelle mounted atop the tower;
- power generating components housed within the nacelle;
- a rotor hub rotationally coupled to the power generating components; and
- a plurality of blades fixed to the rotor hub, the blades comprising a root section extending radially outward from the rotor hub, and an aerodynamic section extending radially outward from the root section, the method comprising attaching aerodynamic fins in a fixed relationship relative to the rotor hub between the blade root sections such that the fins extend radially outward from the rotor hub between the root sections of the blades, the fins having an aerodynamic shape so as to capture wind and impart rotational torque to the rotor hub from a central impinging wind zone that is coaxial to the rotor hub and coincident with the blade root sections; and wherein the rotor hub comprises a base and a nose cone having multiple segments mounted over the base, the method further comprising attaching a respective aerodynamic fin to each of the nose cone segments.

8. The method as in claim 7, comprising performing the method as a retrofit to existing wind turbines at a wind turbine site.

* * * * *